No. 830,593. PATENTED SEPT. 11, 1906.
J. N. JOHNSON.
BELT COUPLING.
APPLICATION FILED JULY 31, 1905.
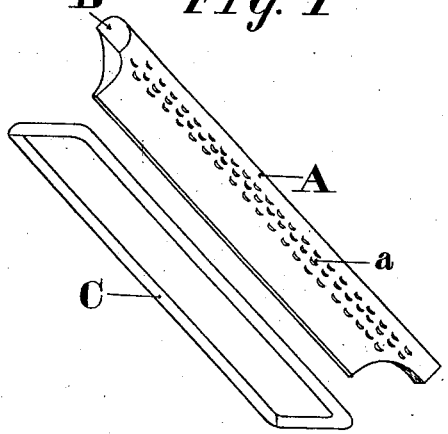
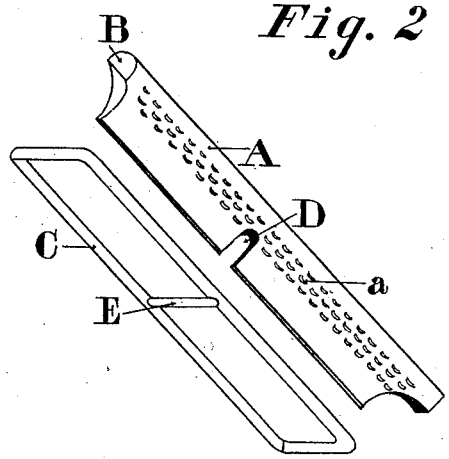
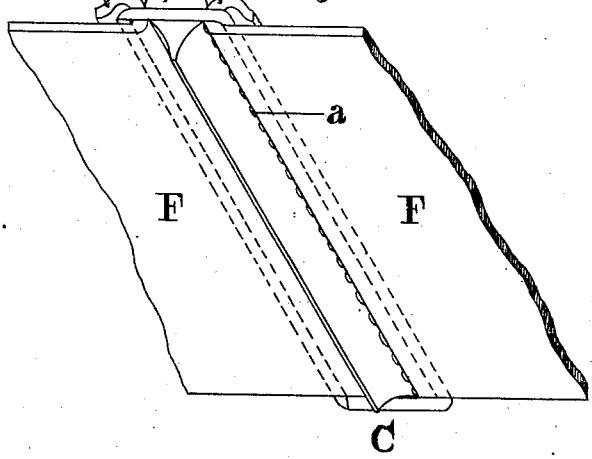
Witnesses
Louis Evans
Mary L. Kingsbury
Inventor
John N. Johnson
per
John R. Mason
Attorney

UNITED STATES PATENT OFFICE.

JOHN N. JOHNSON, OF VAN BUREN, MAINE.

BELT-COUPLING.

No. 830,593.　　　　Specification of Letters Patent.　　　　Patented Sept. 11, 1906.

Application filed July 31, 1905. Serial No. 271,944.

*To all whom it may concern:*

Be it known that I, JOHN N. JOHNSON, a citizen of the United States, residing at Van Buren, in the county of Aroostook and State of Maine, have invented certain new and useful Improvements in Belt-Couplings; and I do hereby declare the following to be a full, clear, and exact description of the invention, such as will enable others skilled in the art to which it appertains to make and use the same.

My invention relates to an improvement in belt-couplings, and has for its object the provision of novel and effective means for securing adjacent belt ends together.

The device is fully illustrated in the accompanying drawings, in which—

Figure 1 is a perspective view of the two members constituting the coupling, showing the same separated ready for inserting the ends of a belt into the loop. Fig. 2 is a similar view of a slightly-modified form of construction. Fig. 3 is a perspective view of the coupling, showing the ends of the belt secured therein.

Similar letters refer to corresponding parts throughout the figures.

The coupling embodies two members, a metallic loop C, having an elongated or rectangular opening as long as the width of the belt and slightly wider than the double thickness of the belt to be coupled.

A lock-bar A acts in connection with the loop C to secure the belt ends in the coupling, the said bar being substantially wedge shape in cross-section and preferably being provided with ears B, projecting from each end at the base of the lock-bar and designed to bear upon the ends of the loop and limit the penetration of the lock-bar between the ends of the belt and the loop. This lock-bar is preferably formed with pointed projections or spurs $a$ or their equivalent, adapted to engage or penetrate the belt in such manner as to prevent its being withdrawn from the loop.

In operation the ends of a belt F are passed through the loop, as shown in Fig. 3, and the lock-bar A is then inserted between the adjacent ends of said belt and forced inwardly with sufficient pressure to cause the projections or spurs $a$ on the faces of the lock-bar to bite into or engage the adjacent faces of the belt ends, and as the belt is operated and the strain tends to pull the ends of the belt apart the lock-bar will be drawn farther into the loop, so that the greater the strain the more tightly are the ends held between the lock-bar and the sides of the loop and all possibility of the ends escaping from the loop is practically eliminated. It is preferable in inserting the belt ends to insert the extreme end G thereof through the loop sufficiently far to provide enough material that a grip will be assured when strain is exerted on the belt.

In Fig. 2 I show the loop C provided with a cross-bar or tongue E and the lock-bar A provided with a slot or groove D. With this construction the ends of the belt, as will be apparent, must be slotted to receive the cross-bar or tongue E.

Having fully described my invention, what I claim, and desire to secure by Letters Patent, is—

A belt-coupling embodying an elongated loop to receive the ends of the belt and a lock-bar wedge-shaped in cross-section, adapted to be inserted in the loop and wedge the belt against the side arms of said loop, and ears at the ends of said lock-bar to rest on the end bar of the loop to limit the movement inwardly in said loop of the lock-bar.

JOHN N. JOHNSON.

Witnesses:
　PETER C. KEEGAN,
　ALLAN E. HAMMOND.